US007257097B2

(12) United States Patent
Jung (10) Patent No.: US 7,257,097 B2
(45) Date of Patent: Aug. 14, 2007

(54) APPARATUS FOR SEARCHING A SIGNAL IN MOBILE COMMUNICATION SYSTEM AND METHOD THEREOF

(75) Inventor: Hyung Sung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 866 days.

(21) Appl. No.: 10/020,871

(22) Filed: Dec. 19, 2001

(65) Prior Publication Data
US 2002/0110103 A1     Aug. 15, 2002

(30) Foreign Application Priority Data
Dec. 21, 2000   (KR) ............................... 2000-79553

(51) Int. Cl.
    *H04B 7/216*     (2006.01)
(52) U.S. Cl. ..................... 370/320; 370/335; 370/332; 370/318
(58) Field of Classification Search ............... 370/318, 370/320, 328, 332, 310
    See application file for complete search history.

(56) References Cited

U.S. PATENT DOCUMENTS

| 5,577,025 | A  | * | 11/1996 | Skinner et al. ............. 370/209 |
| 5,590,160 | A  | * | 12/1996 | Ostman ..................... 375/367 |
| 5,644,591 | A  | * | 7/1997 | Sutton ........................ 375/142 |
| 5,781,543 | A  | * | 7/1998 | Ault et al. .................. 370/342 |
| 5,790,589 | A  | * | 8/1998 | Hutchison et al. .......... 375/149 |
| 6,069,880 | A  | * | 5/2000 | Owen et al. ................. 370/311 |
| 6,104,748 | A  | * | 8/2000 | Kaku .......................... 375/235 |
| 6,154,487 | A  | * | 11/2000 | Murai et al. ................ 375/150 |
| 6,212,219 | B1 | * | 4/2001 | Shou et al. .................. 375/130 |
| 6,333,926 | B1 | * | 12/2001 | Van Heeswyk et al. .... 370/335 |
| 6,370,397 | B1 | * | 4/2002 | Popovic et al. ............. 455/561 |
| 6,421,373 | B1 | * | 7/2002 | Saito .......................... 375/148 |
| 6,445,714 | B1 | * | 9/2002 | d'Anjou et al. ............. 370/441 |
| 6,466,606 | B1 | * | 10/2002 | Jou ............................ 375/130 |
| 6,480,529 | B1 | * | 11/2002 | Sih et al. .................... 375/152 |
| 6,618,430 | B1 | * | 9/2003 | Khaleghi et al. ........... 375/147 |
| 6,636,553 | B1 | * | 10/2003 | Sriram ....................... 375/130 |
| 6,668,010 | B1 | * | 12/2003 | Minematsu ................. 375/145 |
| 6,724,807 | B1 | * | 4/2004 | Krasner et al. ............. 375/143 |
| 6,873,664 | B1 | * | 3/2005 | Clark .......................... 375/340 |
| 6,882,682 | B1 | * | 4/2005 | Tanaka ....................... 375/150 |
| 2002/0181632 | A1 | * | 12/2002 | Kang et al. ................. 375/354 |
| 2002/0186750 | A1 | * | 12/2002 | Callaway et al. ........... 375/141 |
| 2004/0076223 | A1 | * | 4/2004 | Krasner et al. ............. 375/143 |

FOREIGN PATENT DOCUMENTS

WO     WO 00/59123     10/2000

* cited by examiner

*Primary Examiner*—Wing Chan
*Assistant Examiner*—Andrew C. Lee
(74) *Attorney, Agent, or Firm*—Ked & Associates, LLP (57) ABSTRACT

Apparatus and methods for signal search in a mobile communication system can process input signals in parallel. A signal searcher apparatus in a communication system can include a first sequential storage device and a second sequential storage device for respectively storing PN codes and input signals. The signal searcher can include a plurality of despreading devices that despread in parallel the input signals having I and Q components by respectively using the PN codes. In a case where the length of coherent accumulation is a plurality of the number of despreading devices, additional buffers store (e.g., temporarily) the accumulated despreaded signals each having I and Q components that are equal to the number of searched PN offsets. According to preferred embodiments of the present invention, pilot signals searching speed can be increased and/or the length of PN offset and coherent calculation can be increased.

13 Claims, 4 Drawing Sheets

APPARATUS FOR SEARCHING A SIGNAL IN MOBILE COMMUNICATION SYSTEM AND METHOD THEREOF

BACKGROUND OF THE INVENTION

1. Field of the Invention

The present invention relates to a CDMA mobile communication system and more particularly, an apparatus and method for searching PN offsets.

2. Background of the Related Art

Generally, a Code-Division Multiple Access (CDMA) mobile communication system is made up of at least a mobile station and a base station. The mobile communication system signal, which is modulated and transmitted from the mobile station, is received and then demodulated by the base station, and restored to original signals. At this time, the mobile communication signal includes a pilot signal for time synchronization and an electric power control. The pilot signal is spread with a PN (pseudo noise) code, which is specific to each user's mobile terminal, and is transmitted to the base station. The base station can demodulate the received signals from particular PN offsets, which are time delay offsets of multiple path components and can be found by a search operation.

It is possible to search for the PN offsets by executing the despreading of every possible offset. After the despreading with every possible offset, the energies for each offset are estimated. The demodulation of the received signal is performed from the PN offsets having a bigger energy value than a specific threshold value among a plurality of energy values. The device that performs the above-described operations is generally known as "searcher".

Figure 1:
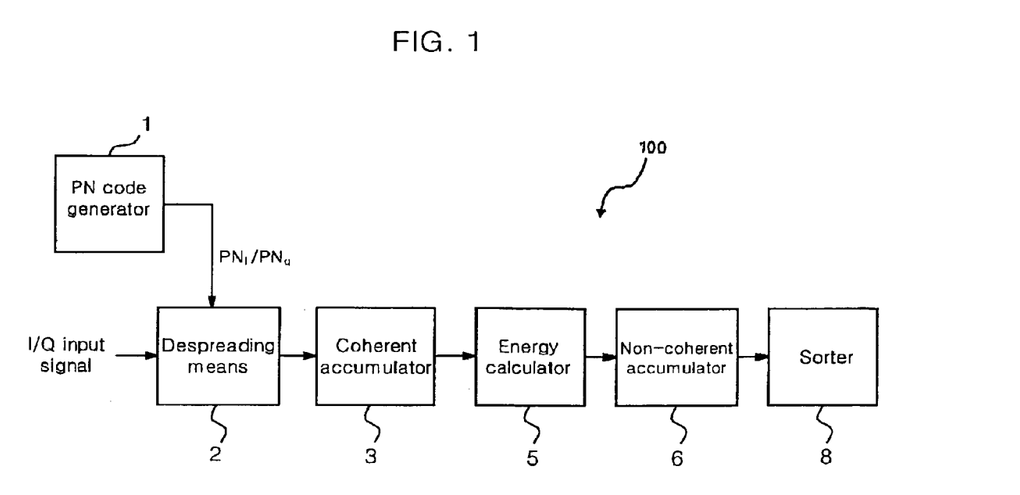
FIG. 1 is a block diagram illustrating a related art apparatus for pilot signal search.

FIG. 1 is a block diagram showing a related pilot signal searcher. As shown in FIG. 1, a searcher 100 includes a PN (pseudo noise) code generator 1, a despreading device 2, a coherent accumulator 3, an energy calculator 5, a non-coherent accumulator 6, and a sorter 8. An input signal received through an antenna (not shown) is input into the despreading device 2 after being separated into an I (in-phase) component and a Q (quadrature) component. When the I and Q component input signals are both input into the despreading device 2, the PN code generator 1 creates corresponding I and Q PN codes for input into the despreading device 2. The PN code generator 1 generates the PN codes corresponding to one PN offset. The I and Q component input signals are input into the despreading device 2 as many as the number determined at the coherent accumulator 3 and the non-coherent accumulator 6. The despreading device 2 despreads the received input signals by using the inputted PN codes and transmits output signals into the coherent accumulator 3. Output signals from the despreading device 2 are the I and Q components. That is to say, the despreading device 2 despreads the first input signal by using relevant first PN code among the PN codes, and then despreads the second input signals that are input after the first input signal using the next relevant PN code. The above-described operations are repeated according to the number of input signals determined by the coherent accumulator 3 and the non-coherent accumulator 6.

The coherent accumulator 3 accumulates each inputted component (I and Q). The accumulated I and Q components yield an energy value by squaring each component and adding both squared results with an energy calculator 5. To estimate the energy value more accurately, the energy value from energy calculator 5 is averaged for a given period of time by the non-coherent accumulator 6. Here, the energy value means an energy value for one PN offset.

To estimate the energy for different PN offsets, the same process described above is again performed except the PN code changes, which is generated with different PN offset by the PN generator 1. The non-coherent accumulator 6 determines averaged energy values for a plurality of energy values, which are the energy values for possible PN offsets. The process is expressed in the following numerical formula, where the energy value of one offset is:

$$E = \sum_{n=1}^{N} \left\{ \frac{\left(\sum_{m=1}^{M} I(nM+m) \cdot PN_i(nM+m)\right)^2}{I \text{ coherent accumulation}} + \frac{\left(\sum_{m=1}^{M} Q(nM+m) \cdot PN_q(nM+m)\right)^2}{Q \text{ coherent accumulation}} \right\} / N$$

where I(.) and Q(.) are the input signal of I and Q components, respectively and $PN_i$ and $PN_q$ mean the PN code for I and Q, respectively. The numerical formula exemplifies M times of coherent accumulation and N times of non-coherent accumulation.

The sorter 8 sorts the multiple averaged energy values for every possible PN offset from the non-coherent accumulator 6 in a descending order. In this way, if sorting is performed based on an energy mean value yielded for every possible PN offset, a finger manager (not shown) allocates PN offsets, which have bigger energy mean value than a specific energy mean value threshold, to fingers. Then, the fingers demodulate the received signal from the assigned PN offsets.

Figure 2:
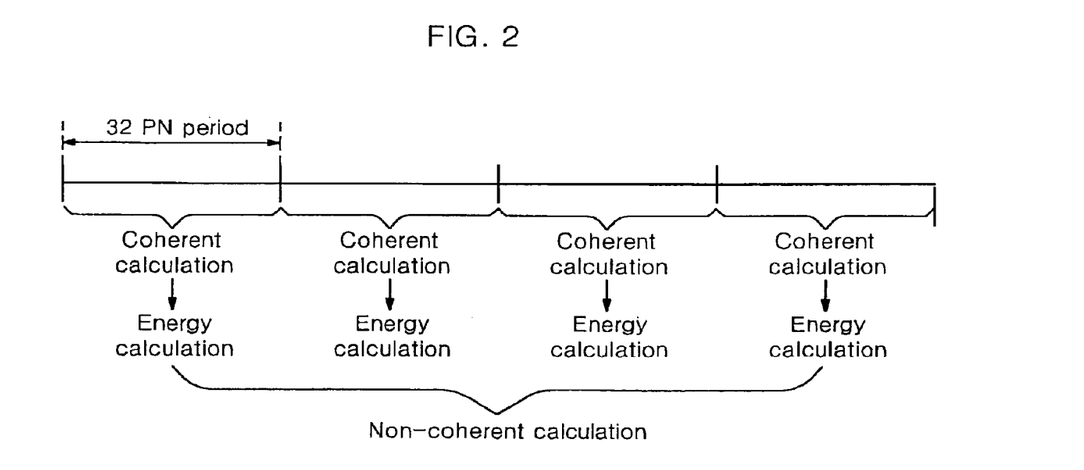
FIG. 2 is a diagram illustrating the timing of energy calculation for a related art offset.

FIG. 2 is a diagram that illustrates a coherent calculation for one PN offset is 32 PN chip and a non-coherent calculation is 4. As shown in FIG. 2, 32 pieces of input signals for the first 32 PN codes are respectively despreaded, their outputted values are accumulated, then an energy value is determined, and the coherent calculation that outputs one energy value can be performed again. For the next 32 PN codes, the next 32 pieces of input signals are respectively despreaded and the coherent calculation, which outputs one energy value, is again performed. Each energy value is calculated by repeating the same process (e.g., as shown in FIG. 2, twice more) and then, through the non-coherent calculation, which calculates the mean value of these energy values (e.g., 4), an energy value for one PN offset can be calculated.

However, as described above, the related art CDMA mobile communication system has various disadvantages. In the CDMA mobile communication system, the searcher of a base station should search for each time delay for every multiple paths and the signals of many user's mobile terminals. With the related art searcher, there has been a limit to searching for a pilot signal in a high speed. Thus, there exists a need to reduce time to search for PN offsets.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and a method for searching for pilot signals in a high speed by processing input signal by using a plurality of despreading circuits.

Another object of the present invention to provide an apparatus and a method that increases the number of retrievable PN offset per unit clock period.

Another object of the present invention to provide an apparatus and a method to provide coherent calculation in a selectable unit of PN chips by using adders and a buffer.

Another object of the present invention is to provide a mobile communication system having an apparatus and method for searching PN offsets of multiple paths using a plurality of despreaders coupled in parallel.

To achieve the above objects in a whole or in part, there is provided An apparatus for searching a pilot signal that is received through multiple paths in a CDMA mobile communication system, the apparatus includes a first shift register bank that sequentially stores PN codes, a second shift register bank that sequentially stores input signals, a plurality of despreading means for despreading the input signals using the PN codes, wherein the plurality of despreading means despread the input signals in parallel to output despreading signals, a coherent accumulator that accumulates the despreading signals, energy calculation means for yielding an energy value using accumulated signals from the coherent accumulator, and a non-coherent accumulator that determines an average value of the energy value for a prescribed time.

To further achieve the above objects in a whole or in part, the coherent accumulator can include a plurality of first adders for accumulating the currently despreaded signals, and a plurality of second adders for adding first accumulation signal and second accumulation signal which have accumulated the despreaded signals and previously stored.

To further achieve the above objects in a whole or in part, there is provided method for searching a signal received using multiple paths in a communication system, the method including storing PN codes sequentially, storing a set of input signals sequentially from a first input signal to a last input signal, despreading the set of input signals in parallel by using the PN codes, outputting an accumulation signal by accumulating despreaded signals, yielding an energy value of the accumulation signal and an average energy value of the energy value, wherein the average energy value is determined over a prescribed time, and determining average mean values corresponding to PN offsets after shifting the set of input signals and repeating the despreading to yielding steps.

To further achieve the above objects in a whole or in part, the method can include storing in a buffer more than one first accumulation signal yielded whenever the input signals are shifted sequentially in case that the length of coherent accumulation is a plurality of the unit length of the coherent accumulation; and adding at least more than the first accumulation signal and at least more than one second accumulation signal yielded whenever newly inputted different input signals are despreaded with another PN code.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
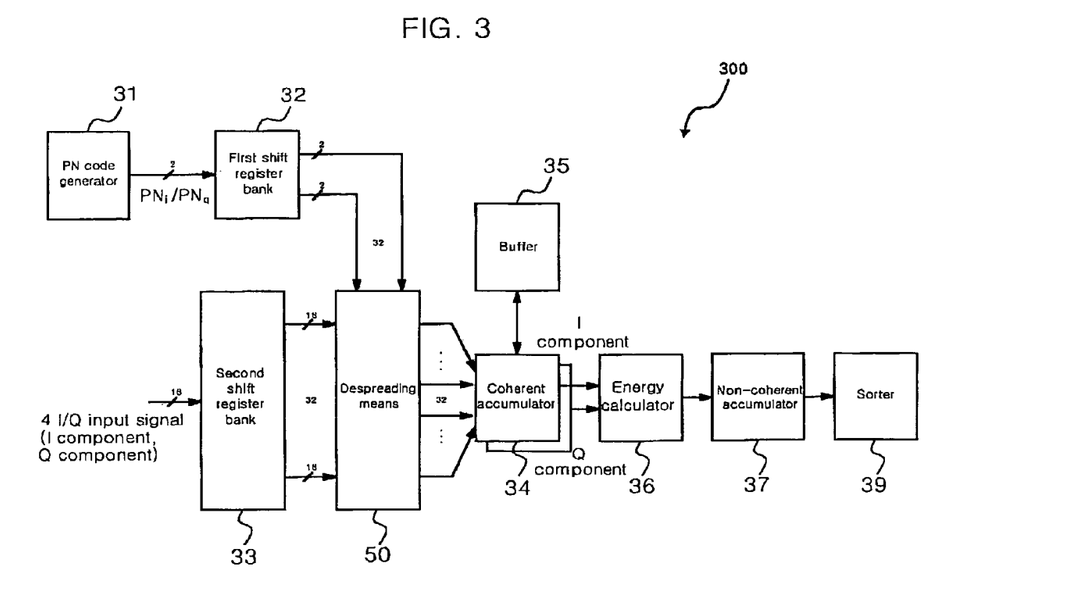
FIG. 3 is a block diagram illustrating an apparatus for pilot signal search according to a preferred embodiment of the present embodiment.

FIG. 3 is a block diagram illustrating a preferred embodiment of an apparatus for signal search according to the present invention. As shown in FIG. 3, the preferred embodiment of an apparatus will be described for pilot signal search performing coherent accumulation in the unit of 32 PN chips and searches in the resolution of ½ PN chip. However, the present invention is not intended to be so limited. As shown in FIG. 3, a pilot signal searcher 300 includes a first shift register bank 32 for sequentially storing PN codes, a second shift register bank 33 for sequentially storing input signals, and a despreader 50 can include a plurality of despreading circuits for despreading in parallel the input signals using the PN code. A coherent accumulator 34 is for accumulating the despreaded signals outputted from the despreading circuit 50, and a buffer 35 is for storing temporarily accumulation signals from the coherent accumulator 34 accumulated when the accumulation length of a coherent accumulator 34 is a plurality of the coherent accumulation unit, which is 32 PN chips in this example of the preferred embodiment of an apparatus for signal search.

The signal searcher 300 also includes a PN code generator 31, an energy calculator 36, a non-coherent accumulator 37, and a sorter 39. The PN code generator 31 creates PN codes with some possible PN offsets and provides the first shift register bank 32 with the PN codes. The energy calculator 36 yields an energy value by squaring and adding the accumulation signal of each component based on the accumulation signal of each component (e.g., I and Q component) calculated by being accumulated from the coherent accumulator 34. Here, the energy value means an energy value for one PN offset. The non-coherent accumulator 37 preferably produces an energy mean value by averaging energy values for a prescribed period of time based on the energy value. In the pilot signal searcher 300, at least more than one energy mean values for possible PN offsets can be yielded. The sorter 39 preferably sorts the at least more than one energy mean values, which are calculated from some possible PN offsets, in a descending order.

Figure 4:
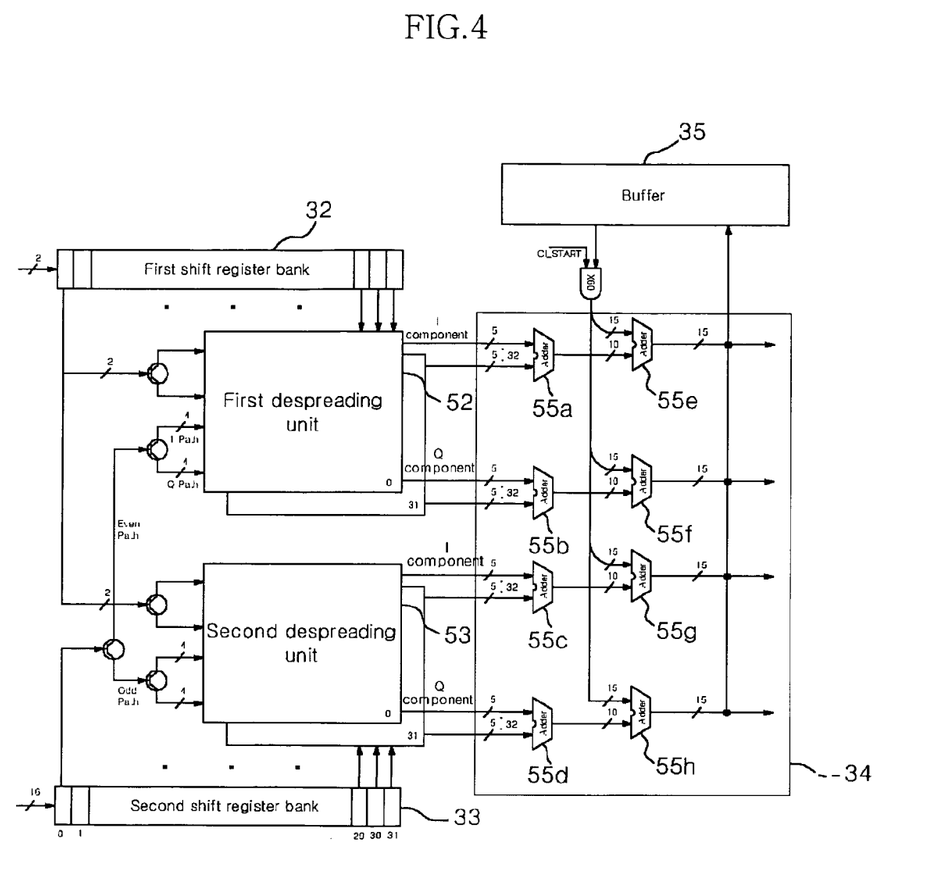
FIG. 4 is a block diagram illustrating a despreading circuit as shown in FIG. 3.

The first shift register bank 32, the second shift register bank 33, the despreading circuit 50, and the coherent accumulator 34 will now be described in more detail. FIG. 4 is a block diagram illustrating a configuration including the despreading circuit 50 and the coherent accumulator 34 as shown in FIG. 3.

As shown in FIG. 4, the first shift register bank 32 and the second shift register bank 33 can store, for example, 32 data for the preferred embodiment of an apparatus for pilot signal search, respectively. That is to say, the first shift register bank 32 can store 32 two-bit PN codes by right-shifting two-bit PN codes received from the PN code generator 31 according to the order of input. Also, the second shift register bank 33 can store 32 input signals by right-shifting input signals, which is incoming in the type of 16-bit for example, according to the order of input. The two-bit PN code preferably occupies one bit with an I component and one bit with a Q component. Also, a stored 16-bit input signal occupies 8-bits with the even-path and 8-bits with the odd-path, respectively, and the 8-bits can respectively occupy 4-bits each with the I component and the Q component. The even-path and the odd-path are signals, which are sampled in the unit of ½ PN chip (half chip) before being input into the despreading circuit 50. Preferably for the first shift register bank 32 and the second shift register bank 33, careful attention should be paid not to transmit PN codes and input signals into the despreading circuit 50 before PN codes and input signals are stored in the unit of 32 pieces, respectively. That is, the despreading operation of the despreading circuit 50 is not started until the first shift register bank 32 and the second shift register bank 33 are full with 32 pieces of PN codes and 32 pieces of input data or input signals, respectively.

The despreading circuit 50 includes a first despreading unit 52 for despreading input signals on the even-path and a second despreading unit 53 for despreading input signals on the odd-path. As shown in FIG. 4, the despreading circuit 50 includes the first despreading unit 52 and the second despreading unit 53. However, the despreading circuit 50 can also include a third despreading unit, a fourth despreading unit, and additional despreading units if a communication system searches a pilot in a resolution higher than ½ PN chip. The first despreading unit 52 and the second despreading unit 53 can each include 32 despreading devices for this example of the preferred embodiment of the pilot signal searcher 300. As described above, the PN codes and the input signals are respectively stored in units or groups of 32 pieces in the first shift register bank 32 and the shift register bank 33. The same PN codes are preferably inputted to the first despreading unit 52 and the second despreading unit 53. Therefore, since one despreading unit is required to despread an input signal with I/Q PN codes, in order to despread the PN codes and input signals that have 32 pieces respectively, 32 pieces of despreading devices can preferably be configured in parallel. The first despreading unit 52 and the second despreading unit 53 output 32 despreaded results in the I component type and 32 despreaded results in the Q component type, which are received by the coherent accumulator 34, respectively.

Thus, as shown in FIG. 4, the coherent accumulator 34 receives 64 pairs of the despreaded signal (32 pairs for even-path and 32 pairs for odd-path, respectively) having I and Q components, which are despreaded simultaneously or concurrently and in parallel. The coherent accumulator 34 preferably accumulates the 64 pairs of the despreaded signal respectively, and outputs the accumulation signal having I and Q component for the even-path and the odd-path, respectively. The coherent accumulator 34 is preferably an adder or an adding circuit or the like. As shown in FIG. 4, the adder includes first adder 55a, 55b, 55c, and 55d. The accumulation signal having I and Q components is inputted into the energy calculator 36 and can be outputted as an energy value by adding values preferably determined by squaring each component.

As described above, the coherent accumulator 34 can output the I and Q accumulation results (e.g., for even-path and odd-path), which are the accumulation of 32 despreaded results, respectively. If the coherent accumulation length is larger than the coherent accumulation unit, which is 32 as shown in FIG. 4, other methods can be used. For example, if the length of the coherent accumulation is a plurality of the coherent accumulation unit (e.g., 32 in FIG. 4), the coherent accumulator 34 can further contain a second adder 55e, 55f, 55g, 55h. The despreaded and coherent accumulated results having I and Q components are then accumulated by the first adder 55a, 55b, 55c and 55d and temporarily stored, for example, in buffer 35 (e.g., a first accumulation signal). At this time, whenever the input signals, which are included into the second shift register bank 33, are shifted sequentially, more than one first accumulation signal is outputted from the coherent accumulator 34 and more than one accumulation result (e.g., additional accumulation results) can be sequentially stored into the buffer 35, and those results are for other PN offsets.

If the input signals terminate shift operation, the next 32 PN codes are sequentially stored in the first shift register bank 32 and the next input signals are sequentially stored into the second shift register bank 33, and the same process for coherent accumulation described above outputs a second accumulation signal (or at least more than one accumulation signal) from the first adder 55a, 55b, 55c, and 55d. The second adder 55e, 55f, 55g and 55h can add the second accumulation signal (or more than one second accumulation signal) and the (more than one) first accumulation signal that has been stored. At this time, the addition should be carefully arranged such that the order in which at least more than one first accumulation signal is stored in the buffer should be according to the corresponding order in which the at least more than one second accumulation signal is determined.

As shown in FIG. 4, the first adder 55a, 55b, 55c and 55d and the second 55e, 55f, 55g and 55h can be arranged to be plural to accumulate the even-path (the I component and Q component) and the odd-path (the I component and Q component), respectively. In preferred embodiments of the pilot signal searcher 300, the first adder 55a, 55b, 55c and 55d and the second adder 55e, 55f, 55g and 55h are each configured to have four sets, respectively, but the first adder and the second adder may include over four sets by various modifications and the present invention is not intended to be so limited.

Operations seeking a PN offset or an optimum PN offset by using a searcher according to preferred embodiments of the present invention will now be described. Two pair of input signals having I and Q components, which have been sampled, are inputted into the second shift register bank 33 in the unit of half chip and a pair of I and Q PN codes, which is coming out of the PN code generator 31, is inputted into the first shift register bank 32. As shown in FIG. 4, the input signal having the I and Q component of the even-path (8-bits) and odd-path (8 bits), and the I and Q PN code is a pair (totals 2-bits). The input signal and PN code are stored into each shift register bank 32, 33 (e.g., preferably during non-operation time) until, for example, 32 pieces of the input signal and the PN code each is stored into each of the shift register banks 32, 33. When the 32 pieces of the input signals and 32 pieces of PN codes are simultaneously inputted into the despreading circuit 50, despreading operations start. As shown in FIG. 4, the despreading circuit 50 includes the first despreading unit 52 for despreading in the even-path and the second despreading unit 53 for despreading in the odd-path.

First, in the half chip, the 8-bit input signal in the previous even-path is inputted into the first despreading unit 52. The 8-bit input signal in the odd-path following ½ PN chip is inputted into the second despreading unit 53. Also, the I and Q PN code from the first register bank 32 is inputted into the first despreading unit 52 and the despreading unit 53, respectively. At this time, the 8-bit input signals in the even-path and the 8-bit input signal in the odd-path is divided into 4-bits having an I and Q component input signal and is respectively input into the first despreading unit 52 and the second despreading unit 53. As described above, the first despreading unit 52 and the second despreading unit 53 can include respectively 32 pieces of despreading devices. Accordingly, the 32 pieces of PN code and input signal stored in the first shift register bank 32 and the second shift register bank 33 are input into the first despreading unit 52 and the second despreading unit 53.

Further, 32 pieces of the input signal having I and Q components are despreaded by using the 32 pieces of PN codes with the first despreading unit 52 and the second despreading unit 53.

For example, if the PN codes stored in the first register bank 32 are designated as the first PN code, the second PN code, etc., and the input signals (I and Q) stored in the second shift register bank 33 are designated as the first input signal, the second input signal, etc. In addition, the first despreading unit 52 includes 32 pieces of despreading devices that are designated the first even-path despreading device, the second even-path despreading device, etc. In this arrangement, the first despreading unit 52 can be described from the first even-path despreading device to the 32nd even-path despreading device. The second despreading unit 53 can be described from the first odd-path despreading device to the 32nd odd-path despreading device.

In the first register bank 32, from the first PN code to the 32nd code can be stored, and also, in the second shift register bank 33, from the first input signal to the 32nd input signal can be stored. Operations of the despreading unit 52 for despreading the first even-path can be described as the first PN code and the first input signal are despread at the first even-path despreading device, the second PN code and the second input signal are despread at the second even-path despreading device, and, lastly, the 32nd the PN code and the 32nd input signal can be despread at the 32nd even-path despreading device. The second despreading unit 53 can despread the input signal of the odd-path using the same process as the first despreading unit 52. The first despreading unit 52 includes 32 even-path despreading devices and outputs 32 pieces of the despreaded results having I and Q components to the coherent accumulator 34.

The 32 pieces of the despreaded results having I and Q component are inputted into a plurality of the first adder 55a and 55b, respectively, and accumulated therein. Also, accumulated two accumulation signals (e.g., each having I and Q components) are transmitted from the coherent accumulator 34 into the energy calculator 36 and yield an energy value. The energy value is just for one PN offset. To calculate an energy value for the next PN offset, a new input signal is preferably inputted into the second shift register bank 33 and all of the contents of the second shift register bank 33 are shifted right while the contents of the first shift register bank 32 are maintained. After calculating the energy values for all possible PN offsets, the non-coherent accumulation process should be performed. The energy values for non-coherent accumulation can be calculated by the same process as described above except that the PN codes saved in the first shift register bank 32 are preferably the next 32 PN codes following the 32 PN codes used in the above described process. The coherent accumulation process is repeated until the necessary number of energy values for the non-coherent accumulation is again yielded or reached. The non-coherent accumulated energy values for all possible PN offsets are outputted from the non-coherent accumulator 37 to the sorter 39 and preferably sorted in descending order therein.

Figure 5:
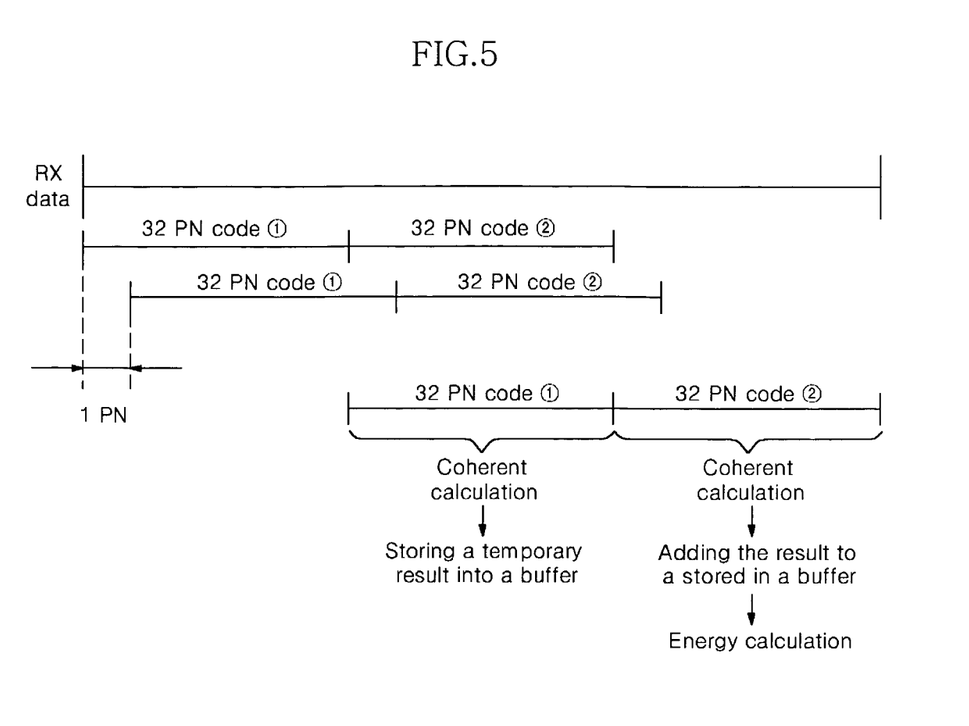
FIG. 5 is a diagram illustrating energy calculation timings according to a preferred embodiment of the present invention.

A case where the length of the coherent accumulation is a plurality of the coherent accumulation unit, which is 32 as shown in FIG. 4, will now be described. In this case, the second adder 55e and 55f and a buffer 35 can be used. For example, the length of the coherent accumulation is 64 and will be called the first despreading signal and the second despreading signal. The despreaded results from the first despreading unit 52 and the second despreading unit 53 can include 32 pieces of the despreaded results having I and Q components, respectively. However, the first despreaded result outputted from the first despreading unit 52 and the second despreading unit 53 is respectively accumulated by the first adder 55a, 55b, 55c, 55d, and the outputted accumulation signal is temporarily stored in the buffer 35. The storing of the temporal coherent accumulation results is performed for other PN offsets by shifting the second shift register bank 33 while the contents of the first shift register bank 32 is maintained. After storing the temporal coherent accumulation results for all possible PN offsets, the next 32 PN codes following the PN codes used above are loaded to the first shift register bank 32, and the same process is performed as described above. At this time, the second adders 55e, 55f, 55g and 55g are used to add the current coherent accumulation results and the temporal coherent accumulation results stored in buffer 35. The same process is applied to all the possible PN offsets. After finishing the coherent accumulation for all possible PN offsets, the energy calculation and the non-coherent accumulation for all possible PN offsets are performed. Such operation processes for this example can be as shown in FIG. 5. Accordingly, preferred embodiments of the signal searcher can be used to increase the length of coherent calculation.

FIG. 5 is a diagram that describes timing of an energy calculation according to the preferred embodiment of the pilot signal searcher 300 where the coherent accumulation length is 64 PN chips and non-coherent accumulation number is one. As shown in FIG. 5, 64 total pieces of PN codes exist and these can be divided in two. First, the value resulting from coherent calculation for 32 pieces of PN code 1 is preferably stored in the buffer 35, and the same operation is performed for all possible PN offsets by shifting the contents of the second shift register bank 33 while the contents of the first shift register bank 32 is maintained. The value resulting from coherent calculation for the next 32 pieces of PN code 2 is added with the stored value, and the added value can be output. The outputted value is yielded as an energy value to the non-coherent accumulator 37 by the energy calculator 36. Also, as shown in FIG. 5, the energy calculation timing indicates that the same operation is preferably repeated for the PN offset.

Meanwhile, the accumulation signal having I and Q component outputted from the coherent accumulator 34 is inputted into the energy calculator 36 where the accumulation signal having I and Q component is preferably squared and summed up to yield an energy value. The yielded energy value is inputted into the non-coherent accumulator 37 and re-stored as an energy mean value.

After calculating the energy mean values for all possible PN offsets, the sorter 39 sorts the energy mean values. Also, the PN offset corresponding to an energy mean value, which is over prescribed specific energy mean value, can be assigned to a finger by the finger manager (not shown) based on the sorting of the energy mean value by the energy sorter 39.

As described above, preferred embodiments of an apparatus and a method for signal search in the mobile communication system according to the present invention have various advantages. In preferred embodiments of an apparatus and a method for signal search in the mobile communication system, since input signals are processed in parallel by using a plurality of PN despreaders, pilot signals can be searched in high speed. Further, in preferred embodiments of an apparatus and a method for signal search in the mobile communication system, an energy value for a PN offset can be retrieved per each unit of the clock, on average. In addition, since more than 32 pieces of coherent accumulation is performed by using an adder and a buffer, PN offsets to search and the length of coherent calculation can be increased in preferred embodiments of an apparatus and a method for signal search in the mobile communication system according to the present invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for searching a pilot signal that is received through multiple paths in a Code-Division Multiple Access (CDMA) mobile communication system, the apparatus comprising:
   a first shift register bank that sequentially stores pseudo noise (PN) codes;
   a second shift register bank that sequentially stores input signals, wherein the input signals of an even path are sampled in a first half PN chip and the input signals of an odd path are sampled in a following half PN chip;
   first despreading means for despreading the input signals of the even path using the PN codes inputted from the first shift register bank, wherein the first despreading means despreads the input signals of the even path in parallel to output first despreading signals;
   second despreading means for despreading the input signals of the odd path using the PN codes inputted from the first shift register bank, wherein the second despreading means despreads the input signals of the odd path in parallel to output second despreading signals;
   a coherent accumulator that accumulates the first and the second despreading signals;
   energy calculation means for yielding an energy value using accumulated signals from the coherent accumulator; and
   a non-coherent accumulator that determines an average value of the energy value for a prescribed time.

2. The apparatus of claim 1, further comprising sorting means for sorting more than one average value of the energy value that are output whenever the input signals are sequentially shifted.

3. The apparatus of claim 1, wherein the PN codes and the input signals are stored as a separate I component and Q component, respectively.

4. The apparatus of claim 1, wherein the first despreading means and the second despreading means each comprise a plurality of despreading device means that are equal in number to each of the PN codes and the input signals.

5. The apparatus of claim 4, wherein the plurality of despreading device means each are coupled to receive one of the PN codes and one of the input signals, respectively.

6. The apparatus of claim 1, wherein the coherent accumulator comprises:
   a plurality of first adders for accumulating the despreading signals; and
   a plurality of second adders for adding a first accumulation signal and a second accumulation signal, wherein the first accumulation is a signal determined by a first partial coherent accumulation for the PN codes and is stored, and wherein the second accumulation signal is determined by the partial coherent accumulation for next PN codes whenever corresponding next input signals are inputted.

7. The apparatus of claim 1, wherein the second shift register bank shifts the stored input signals one at a time and outputs signals corresponding to PN offsets.

8. A method for searching a pilot signal received using multiple paths in a Code-Division Multiple Access (CDMA) mobile communication system, the method comprising:
   storing pseudo noise (PN) codes sequentially;
   storing a set of input signals sequentially from an input signal to a last input signal, wherein the input signals of an even path are sampled in a first half PN chip and the input signals of an odd path are sampled in a following half PN chip;
   despreading the set of input signals of the even path in parallel by using the PN codes;
   despreading the set of input signals of the odd path in parallel by using the PN codes;
   outputting an accumulation signal by accumulating despreaded signals of the even path and despreaded signals of the odd path;
   yielding an energy value of the accumulation signal and an average energy value of the energy value, wherein the average energy value is determined over a prescribed time; and
   determining average mean values corresponding to PN offsets after shifting the set of input signals and repeating the despreading, the outputting and the yielding.

9. The method of claim 8, wherein the shifting shifts the set of input signals by one so that a penultimate input signal becomes the last input signal and an additional input signal becomes the first input signal, and the method further comprises sorting the average mean values corresponding to the PN offsets.

10. The method of claim 8, further comprising:
   storing in a buffer more than one first accumulation signal determined by partial coherent accumulation yielded where the input signals are shifted sequentially when a length of coherent accumulation is a multiple of a size of the coherent accumulation unit; and
   adding a corresponding more than one stored first accumulation signal and a corresponding more than one second accumulation signal yielded whenever a new partial coherent accumulation results are yielded.

11. The method of claim 10, wherein the adding is performed corresponding to an order of storing said more than one first accumulation signals in the buffer and an order of yielding said more than one second accumulation signal.

12. The method of claim 8, wherein the despreading is executed after a prescribed number of the PN codes and the input signals are stored.

13. The method of claim 8, wherein a number of the despreading signals is determined by the coherent accumulation unit length.

* * * * *